United States Patent [19]

Johnson et al.

[11] Patent Number: 4,598,741
[45] Date of Patent: Jul. 8, 1986

[54] BARRIER VAPOR CONTROL SYSTEM

[75] Inventors: David C. Johnson, San Juan Capistrano; James S. Allen, Capistrano Beach, both of Calif.

[73] Assignee: D. C. Johnson & Associates, Inc., El Toro, Calif.

[21] Appl. No.: 652,959

[22] Filed: Sep. 21, 1984

[51] Int. Cl.⁴ .............................................. B65B 3/04
[52] U.S. Cl. .................................... 141/5; 141/52; 141/302; 141/350
[58] Field of Search ................................. 141/37–66, 141/285–310, 392, 346–362

[56] References Cited

U.S. PATENT DOCUMENTS 3,543,484  12/1970  Davis ....................................... 141/52
4,037,754  7/1977  Wilhelmi et al. .................... 141/350

FOREIGN PATENT DOCUMENTS 586946  11/1959  Canada ............................... 141/302

Primary Examiner—Houston S. Bell, Jr.
Attorney, Agent, or Firm—Stetina & Brunda

[57] ABSTRACT

A barrier vapor control system includes a seal inside an automobile filler pipe for engaging the fuel delivery conduit of a pump nozzle to prevent the escape of hydrocarbon vapors out of the filler pipe into the atmosphere while the fuel tank is being refilled. A vapor recovery conduit downstream of the seal carries the vapors displaced by filling the fuel tank to a cannister that contains a scrubbing agent. A vacuum accumulator and a vacuum pump draw fresh air and the vapors from the fuel tank through the cannister to remove hydrocarbon vapors from the effluent vapors of the fuel tank.

13 Claims, 5 Drawing Figures

BARRIER VAPOR CONTROL SYSTEM

BACKGROUND OF THE INVENTION

This invention relates generally to apparatus and methods for controlling the escape of vapors from a tank being filled with a liquid and particularly to apparatus and methods for collecting vapors from a vehicle fuel tank as the tank is refilled.

It is well known that vehicle fuel tanks are among the primary sources of unburned hydrocarbon vapors in the atmosphere. Hydrocarbon vapors are a major cause of air pollution, and are generally regarded as being detrimental to the health of animals and plants. In response to these environmental problems, current state and federal legislation requires modern passenger automobiles and commercial vehicles to be equipped with a vapor recovery system for controlling evaporation of gasoline from the vehicle fuel system. Such vapor control systems typically comprise a vacuum accumulator for purging the engine of fuel vapors after the engine is turned off and an activated charcoal cannister connected to the fuel tank for scrubbing hydrocarbons from the vapors escaping therefrom.

These prior art vacuum accumulator and charcoal cannister systems function satisfactorily to control unburned hydrocarbon emissions into the atmosphere except when the filler pipe cap has been removed, as is necessary in supplying fuel, such as gasoline, to the automobile fuel tank. Proposed federal regulations would require automobiles to have a system for preventing escape of vapors from the fuel tank even when the filler cap has been removed from the filler pipe, as in supplying fuel to the tank. Large quantities of unburned hydrocarbon vapors are emitted into the atmosphere through the filler pipe as the fuel tank is being refueled. For example, if an automobile has a 25 gallon fuel tank containing only 5 gallons of gasoline then the remainder of the volume of the tank is filled with gasoline vapor. Filling the fuel tank by pumping 20 gallons of gasoline into it therefore forces 20 gallons of gasoline vapor into the atmosphere. If there were approximately 100 million automobiles in the United States, and each automobile used 20 gallons of gasoline per week, then supplying the fuel to the fuel tanks forces several hundred million tons of hydrocarbon vapor into the atmosphere per year.

Some governmental jurisdictions have required fuel pumps for supplying gasoline to automobiles to have a vapor recovery system for collecting the vapors that emanate from a fuel tank as it is being refilled. Such pumps typically have a first hose which carries gasoline to a nozzle and a second hose which carries collected vapors to a storage tank for subsequent disposal by burning. The nozzle has a fuel delivery pipe that is inserted into the automobile filler pipe. The nozzle further includes a boot or bellows-like arrangement around the fuel delivery pipe for forming a seal around the filler pipe when the delivery pipe is inserted a sufficient distance to supply fuel to the fuel tank. The nozzles are designed to be inoperative unless the seal is properly formed. As gasoline enters the fuel tank, the displaced vapor is carried through the vapor collection tube to the vapor hose. The vapor recovery nozzle is required in certain areas of Southern California and has been credited with reducing hydrocarbon emissions from automobiles in those areas.

However, the vapor recovery nozzles are heavy and awkward to operate, particularly for individuals who have little experience with such nozzles. The necessity of having a fuel delivery hose and a vapor recovery hose also contributes to the inconvenience of the vapor recovery nozzle. One of the primary concerns of the vapor recovery nozzle is that if an individual should completely fill the fuel tank, which is not recommended with such nozzles, it may be possible for liquid gasoline to be sucked into the vapor recovery line so that when the tank becomes full, gasoline exits the filler pipe through the vapor recovery line at the same rate at which gasoline enters the filler pipe through the fuel delivery pipe. The vapor recovery nozzles typically cost several hundred dollars, which is much less economical than fuel delivery nozzles found at most gasoline fuel pumps throughout the nation. The cost of the vapor recovery nozzles also causes security problems since it is impractical to remove the nozzles from fuel pumps every time a service station closes at night. Being valuable, the nozzles are often stolen.

Accordingly, there is a need in the art for an efficient, relatively inexpensive, effective apparatus and method for preventing fuel vapors from entering the atmosphere as vehicle fuel tanks are refilled.

SUMMARY OF THE INVENTION

The present invention specifically overcomes and alleviates the difficulties of prior apparatus and methods for controlling the entry of fuel vapors into the atmosphere. The present invention provides a pair of seals inside the filler pipe of a fuel tank to sealingly engage the fuel delivery pipe from a fuel nozzle so that essentially no vapors escape out of the opening of the filler pipe. A conduit extends from the filler pipe downstream of the seals to a charcoal cannister that is connected to a vacuum accumulator through a one-way check valve. As fuel enters the fuel tank, the displaced vapors travel through the vapor conduit to the charcoal cannister where an activated charcoal filtration element scrubs the hydrocarbon vapors from the gaseous material that has been forced out of the fuel tank. A microswitch located between the seals is activated by insertion of the fuel delivery pipe through the sealing arrangement to actuate a vacuum pump to maintain a predetermined vacuum in the vacuum accumulator as fuel is being delivered to the fuel tank. The sealing arrangement preferably includes a flap-type inside seal and an iris-type outside seal. Both the inner seal and the outer seal are formed of material that is sufficiently elastomeric to sealingly engage the fuel delivery pipe and that is substantially inert with respect to gasoline or other hydrocarbon based fuels.

BRIEF DESCRIPTION OF THE DRAWINGS

These as well as other features of the present invention will become more apparent upon reference to the drawings wherein.

DESCRIPTION OF THE PREFERRED EMBODIMENT

Figure 1:
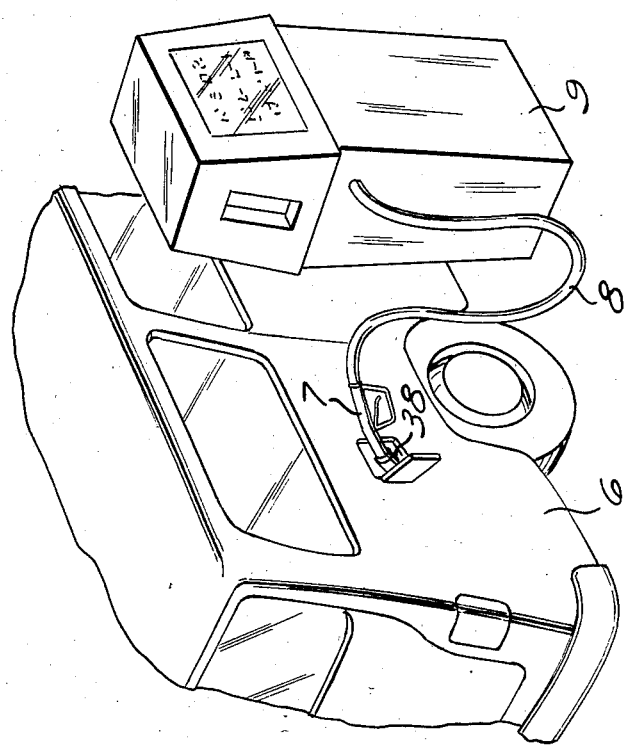
FIG. 1 illustrates a vehicle receiving fuel from a pump into a filler pipe.

Referring to FIG. 1, an automobile or vehicle 6 includes a filler pipe 38 for receiving fuel from a nozzle 7 that is connected by a hose 8 to a pump 9 for transferring hydrocarbon based fuel, such as gasoline, from a storage reservoir (not shown) to the fuel tank of the automobile.

Figure 2:
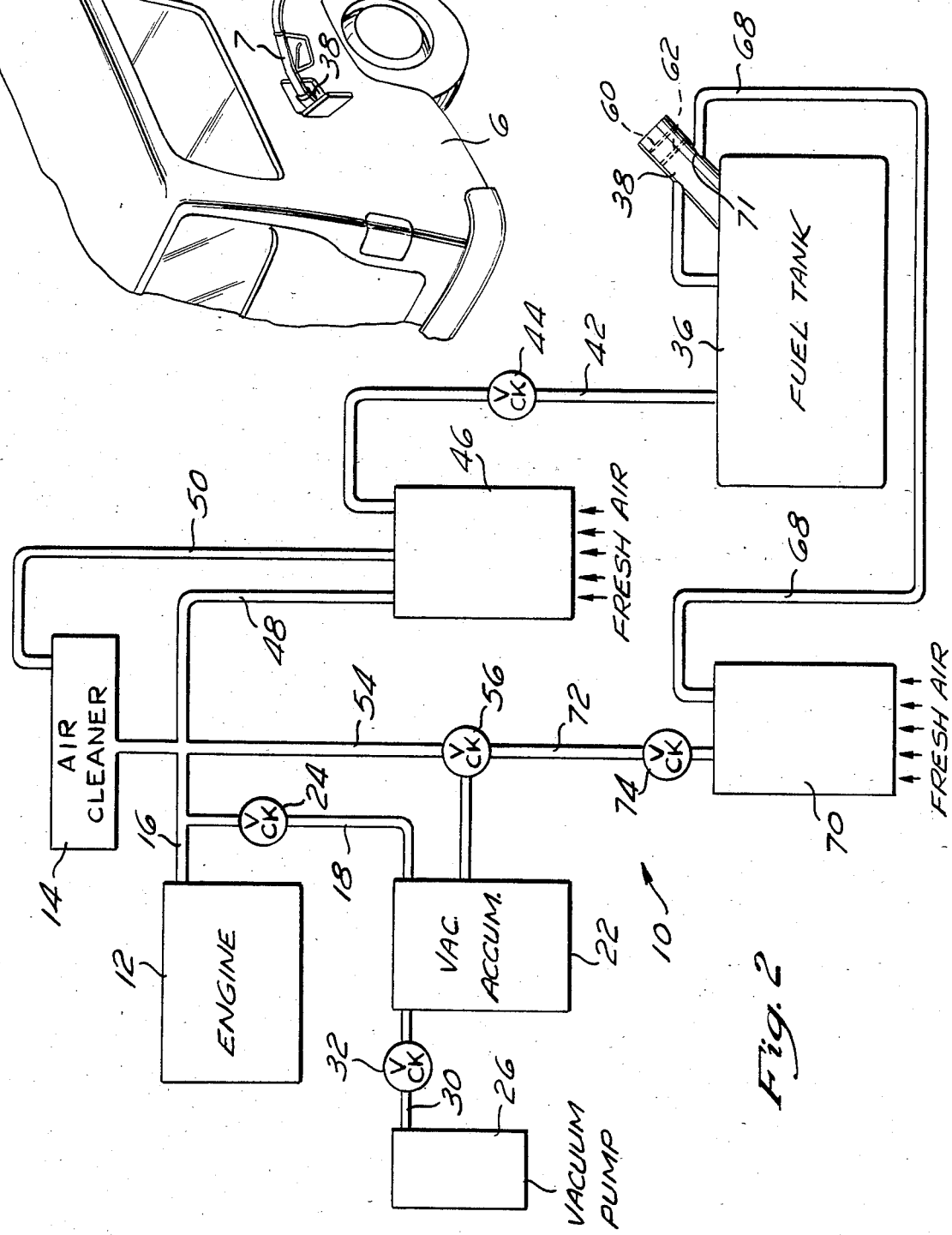
FIG. 2 is a schematic representation of the barrier vapor control system of the present invention and a portion of a vapor control system included in modern automobiles.

Referring to FIG. 2, an automobile vapor control system 10 includes an engine 12 and an air cleaner 14 which supplies air to the engine 12 through an intake manifold 16. A conduit 18 extends between the intake manifold 16 and a vacuum accumulator 22 with a one way check valve 24 being positioned in the conduit 18 to permit fluid flow only from the vacuum accumulator 22 toward the intake manifold 16 to maintain a vacuum substantially equal to that of the intake manifold 16 when the engine 12 is operating.

A vacuum pump 26 is connected to the vacuum accumulator 22 to maintain a predetermined vacuum therein when the engine 12 is inoperative. The vacuum pump 26 is preferably electrically powered by a battery (not shown), which is preferably a 12 volt battery of the kind normally used in automobiles to provide electrical power when the engine 12 is inoperative. A conduit 30 including a one way check valve 32 permits unidirectional fluid flow from the vacuum accumulator 22 toward the vacuum pump 26.

The system 10 includes a fuel tank 36 connected to the filler pipe 38. Vapors, typically gasoline vapors emanating in the fuel tank 36, travel through a conduit 42 and a one way check valve 44 to a cannister 46. The cannister 46 typically contains a scrubbing agent, such as activated charcoal, that removes hydrocarbon vapors from the vapor that emanates from the fuel tank 36 when the filler pipe 38 is capped. The cannister 46 is in fluid communication with the intake manifold 16 and the air cleaner 14 through a conduit 48 and a conduit 50, respectively. When the engine 12 is operating, engine vacuum is generated in the intake manifold 16. The manifold vacuum draws vapors from the fuel tank 36 and ambient fresh air into the cannister 46 to scrub hydrocarbon vapors from the vapor. The manifold vacuum draws the output of the cannister 46 into the intake manifold 16 for input to the engine 12 where any remaining hydrocarbon vapors from the fuel tank 36 are burned during normal engine operation.

When the engine 12 is inoperative and the filler pipe 38 is capped, the vacuum maintained in the vacuum accumulator 22 draws the vapors from the fuel tank 36 into the cannister 46 wherein it is maintained in a closed system until subsequent engine operation is initiated. Upon subsequent engine operation the output of the cannister 46 and accumulator 22 is purged through the conduits 48 and 18 and drawn into the manifold 16 for burning in the engine 12.

The portion of the system 10 described above is well-known as has been required on all new gasoline powered automobiles sold in the United States for several years to control hydrocarbon pollution of the atmosphere.

Figure 3:
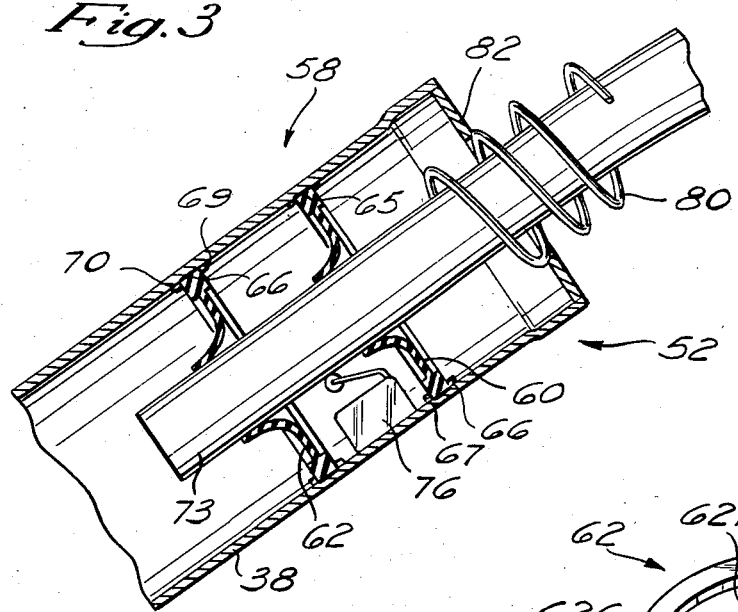
FIG. 3 is a perspective view in a expanded scale showing a fuel delivery pipe sealingly engaged with the inner and outer seals in the filler pipe of FIG. 1.
Figure 4:
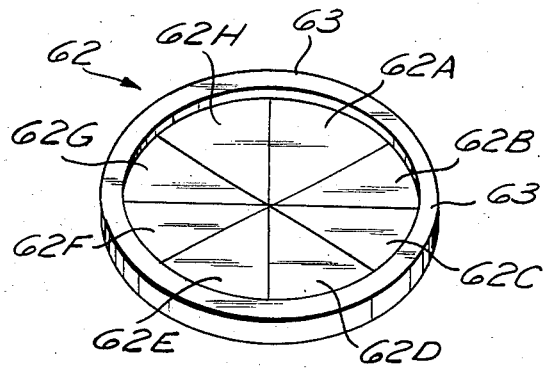
FIG. 4 is a perspective view of an outer seal formed in the filler pipe of the barrier vapor control system of FIG. 1.
Figure 5:
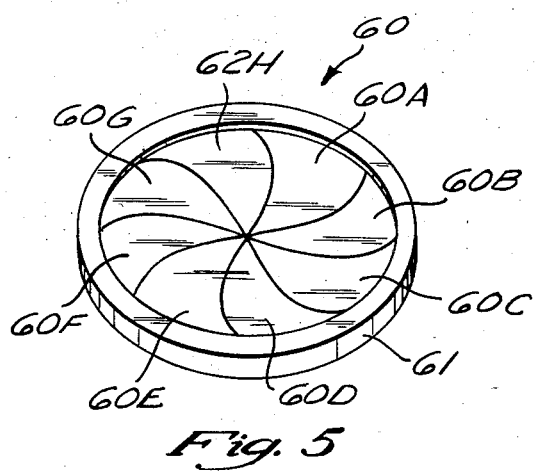
FIG. 5 is a perspective view of an inner seal of the barrier vapor control system of FIG. 1.

The present invention includes novel means for collecting and scrubbing vapors displaced when the fuel tank 36 is refilled. Referring to FIGS. 2-4, the filler pipe 38 includes a seal 58 near its outer end 52. The seal 58 preferably includes an outer sealing member 60 and an inner sealing member 62. The outer sealing member 60 is preferably an iris seal that comprises a plurality of overlapping portions 60A, 60B . . . 60H extending from a ring 61 as shown in FIG. 5. The inner sealing member 62 is preferably a flap seal comprising a plurality of flaps 62A, 62B . . . 62H extending from a ring 63. The sealing members 60 and 62 self-biasing or closed upon themselves to prevent vapors from escaping the fuel tank 36 when it is uncapped. The precise number of portions comprising the sealing members 60 and 62 is not essential to the invention. The number is shown in the particular embodiment of the invention described herein is exemplary only. The sealing members 60 and 62 are preferably formed of an elastomeric substance such as neoprene rubber that is inert with respect to the fuel, usually gasoline, required by the automobile 6. The sealing members 60 and 62 are retained within corresponding annular grooves 65 and 66 formed by pairs of annular projections 66, 67 and 69, 70, respectively.

The sealing members 60 and 62 prevent hydrocarbon vapors from escaping into the atmosphere even when a fuel delivery pipe 73 extending from the nozzle 7 is inserted into the filler pipe 38. Initial insertion causes the iris seal to yield to accomodate the penetrating fuel delivery pipe 73 and sealingly engage the outer surface thereof. Further penetration causes the end of the fuel delivery pipe 73 to project into the filler pipe 38 beyond the inner sealing member 62, which also sealingly engages the outer surface of the fuel delivery tube. As such, a vestibule structure is provided which prevents release of vapors from the fuel tank during insertion and/or removal of the nozzle 7 from the filler pipe 38.

A conduit 68 extends from an opening 71 in the filler pipe 38 between the fuel tank 36 and the inner seal 62. Vapors displaced by pumping fuel into the fuel tank 36 from the fuel delivery pipe 73 pass through the conduit 68 into a cannister 70, which like the cannister 46, contains a scrubbing agent, such as activated charcoal. A conduit 72 carries the output of the cannister 70 to the vacuum accumulator 22 through a check valve 74. The vacuum of the accumulator 22 and the minor pressure caused by adding liquid fuel to the fuel tank 36 provides the impetus for moving the vapors and ambient fresh air through the cannister 70.

A microswitch 76 preferably positioned between the sealing members 60 and 62 is actuated by insertion of the fuel delivery pipe 73 to provide a signal for activating the vacuum pump 26 to maintain a desired vacuum in the vacuum accumulator 22 during normal refueling with the engine 12 being inoperative. Once maintained in the cannister 70 and accumulator 22, the vapors are prohibited from entry into the atmosphere. Subsequently, when restarted after refueling, the isolated vapors from the cannister 70 and the accumulator 22 will be purged into the intake manifold 16 and then into the engine 12 for burning in a manner analogous to that discussed above.

The sealing arrangement 58 permits almost no hydrocarbon vapor to escape from the fuel tank 36 into the atmosphere. As shown in FIG. 3, a typical fuel delivery pipe 73 has a smooth end that penetrates into the filler pipe 38. The fuel delivery pipe 73 may also include a coiled wire 80 for engagement with a lip 82 around the opening of the filler pipe to prevent the fuel delivery pipe 73 from inadvertently slipping out of the filler pipe 38 during refueling operations. The double seal provided by the seal members 60 and 62 is particularly advantageous in preventing escape of vapors during refueling. When the fuel delivery pipe 73 is first inserted, the sealing member 60 forms a seal with fuel delivery pipe before it is further inserted through the second sealing member 62. When the fuel delivery pipe 73 is withdrawn from the filler pipe 38, the sealing member 60 maintains a tight seal around the fuel delivery pipe while the sealing member 62 closes to seal the filler pipe.

The system 10 therefore provides an apparatus and method for controlling hydrocarbon vapor emissions into the atmosphere while a fuel tank 36 is being refilled. It is to be understood that the preferred embodiment is exemplary of only one implementation of the invention and that the invention includes all modifications that are within the scope of the appended claims. The invention is not limited in its applicability to fuel tanks for gasoline powered automobiles and could be employed with any fuel tank or other enclosure that contains vapors that should not be released into the environment as the enclosure is filled with a non-gaseous material.

What is claimed is:

1. A system for controlling vapor emissions from a motor vehicle fuel tank while the tank is being filled with a volatile liquid from a fuel delivery nozzle, comprising:
   sealing means positioned within a filler pipe extending from said fuel tank for forming a seal about the periphery of a fuel delivery nozzle inserted into said filler pipe; and
   means positioned within said filler pipe for collecting vapors, emitted by the volatile liquid, displaced from the tank as volatile liquid fills the tank through said fuel delivery nozzle.

2. The system of claim 1 wherein the sealing means includes:
   a first seal positioned inside the filler pipe adjacent one end thereof; and
   a second seal positioned inside the filler pipe spaced apart from the first seal, the first and second seals being formed to permit insertion of the fuel delivery nozzle into the filler pipe and maintain sealing engagement with the filler conduit as the fuel delivery nozzle is inserted into the filler pipe and withdrawn therefrom.

3. The system of claim 1 wherein the means for collecting vapors includes:
   a vapor recovery conduit extending from the filler pipe downstream of the sealing means to carry displaced vapors away from the fuel tank; and
   means for removing hydrocarbon vapors from the displaced vapors.

4. The system of claim 3 wherein the removing means comprises:
   an activated charcoal cannister connected to the vapor recovery conduit;
   a vacuum accumulator in fluid communication with the cannister for drawing fresh air and displaced vapors into the cannister; and
   pump means for maintaining the vacuum in the vacuum accumulator at a predetermined value.

5. The system of claim 9 further comprising means for actuating the pumping means or the fuel delivery nozzle is inserted into the filler pipe.

6. A system for controlling vapor emissions from a motor vehicle tank while the tank is being filled with a volatile liquid from a fuel delivery conduit, comprising:
   a filler pipe in fluid communication with the tank;
   a first seal positioned inside the filler pipe adjacent one end thereof, and
   a second seal positioned inside the filler pipe spaced apart from the first seal, the first and second seals being formed to permit insertion of the fuel delivery conduit into the filler pipe and maintain sealing engegement with the filler conduit as the fuel delivery conduit is inserted into the filler pipe withdrawing therefrom; and
   means for collecting vapors displaced from the tank as the volatile liquid enters the tank, wherein the means for collecting vapors further comprises:
   a vapor recovery conduit extending from the filler pipe downstream of the sealing means to carry displaced vapors away from the fuel tank, and
   means for removing hydrocarbon vapors from the displaced vapors, wherein said means for removing hydrocarbon vapors further comprises:
   an activated charcoal cannister connected to the vapor recovery conduit,
   a vacuum accumulator in fluid communication with the cannister for drawing fresh air and displaced vapors into the cannister,
   pump means for maintaining the vacuum in the vacuum accumulator at a predetermined value, and
   means for actuating the pumping means as the fuel delivery conduit is inserted into the filler pipe, wherein the actuating means comprises a switch positioned in the filler pipe, such that insertion of the fuel delivery conduit into the filler pipe causes the fuel delivery conduit to actuate the switch.

7. A method for controlling vapor emissions from a motor vehicle fuel tank having a filler pipe extending therefrom while the tank receives a liquid from a fuel delivery conduit, comprising the steps of:
   forming a seal around the fuel delivery conduit as it enters the filler pipe; and
   collecting vapors displaced from the tank as the tank fills with the liquid.

8. The method of claim 7 further including the steps of:
   placing a first seal adjacent one end of the filler pipe; and
   placing a second seal in the filler pipe spaced apart from the first seal.

9. The method of claim 8 wherein the collecting step includes the steps of:
   extending a vapor recovery conduit from the filler pipe downstream of the first and second seals; and
   removing hydrocarbons from the displaced vapor.

10. The method of claim 9 wherein the removing step further comprises the steps of:
    connecting an activated charcoal cannister to the vapor recovery conduit; and
    maintaining a predetermined vacuum in the vapor recovery conduit to draw vapors placed from the fuel tank into the cannister.

11. A method for controling vapor emissions from a motor vehicle tank having a filler pipe extending therefrom while the tank receives a volatile liquid from a fuel delivery conduit, comprising the steps of:
    forming a seal around the fuel delivery conduit as it enters the filler pipe;
    placing a first seal adjacent one end of the filler pipe;

placing a second seal in the filler pipe spaced apart from the first seal; and collecting vapors displaced from the tank as the tank fills with the liquid, wherein said collecting step includes the steps of:

extending a vapor recovery conduit from the filler pipe down stream of the first and second seals; and removing hydrocarbons from the displaced vapor, wherein the removing step further comprises the steps of:

connecting an activated charcoal cannister to the vapor recovery conduit;

maintaining a predetermined vacuum in the vapor recovery conduit to draw vapors placed from the fuel tank into the cannister;

placing a switch in the filler pipe for actuation by insertion and removal of the fuel delivery conduit therefrom, and activating a vacuum pump with the switch to provide the vacuum to the vapor recovery conduit.

12. A system for controlling vapor emissions from a motor vehicle tank while the tank is being filled with a volatile liquid from a fuel delivery conduit, comprising:

a filler pipe in fluid communication with the tank;

a first seal positioned inside the filler pipe adjacent one end thereof, and a second seal positioned inside the filler pipe spaced apart from the first seal, the first and second seals being formed to permit insertion of the fuel delivery conduit into the filler pipe and maintain sealing engagement with the filler conduit as it is inserted into the filler pipe and withdrawn therefrom; and means for collecting vapors displaced from the tank as the liquid enters the tank, wherein the means for collectionng vapors further comprises:

a vapor recovery conduit extending from the filler pipe downstream of the sealing means to carry displaced vapors away from the fuel tank, and means for removing hydrocarbon vapors from the displaced vapors, wherein said removing hydrocarbon vapor means further comprises:

an activated charcoal cannister connected to the vapor recovery conduit;

a vacuum accumulator in fluid communication with the cannister for drawing fresh air and displaced vapors into the cannister;

pump means for maintaining the vacuum in the vacuum accumulator at a predetermined value; and means for actuating the pumping means as the fule delivery conduit is inserted into the filler pipe, wherein the actuating means further comprises a switch actuated by insertion of the fuel delivery conduit into the filler pipe.

13. A method for controlling vapor emissions from a motor vehicle fuel tank having a filler pipe extending therefrom while the tank receives a volatile liquid from a fuel delivery conduit, comprising the steps of:

placing a first seal adjacent one end of the filler pipe;

placing a second seal in the filler pipe spaced apart from the first seal;

collecting vapors displaced from the tank as the tank filles with the liquid, wherein said collecting step further comprises:

connecting an activated charcoal cannister to the vapor recovery conduit;

maintaining a predetermined vacuum in the vapor recovery conduit to draw vapors placed from the fuel tank into the cannister;

placing a switch in communication with the filler pipe and a vacuum pump, for actuation by insertion and removal of the fuel delivery conduit therefrom;

activating a vacuum pump with the switch to provide the vacuum to the vapor recovery conduit; placing a first seal adjacent one end of the filler pipe; and placing a second seal in the filler pipe spaced apart from the first seal.

* * * * *